(12) United States Patent
Madineni (10) Patent No.: US 12,071,006 B2
(45) Date of Patent: Aug. 27, 2024

(54) CONTROLLER UNITS, VEHICLES, AND METHODS FOR DETECTING ENGAGEMENT AND DISENGAGEMENT OF AN AXLE

(71) Applicant: Rivian IP Holdings, LLC, Plymouth, MI (US)

(72) Inventor: Rahul Madineni, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 407 days.

(21) Appl. No.: 17/388,804

(22) Filed: Jul. 29, 2021

(65) Prior Publication Data

US 2023/0035581 A1 Feb. 2, 2023

(51) Int. Cl.
*B60K 23/08* (2006.01)
*B60K 6/52* (2007.10)
*B60K 17/356* (2006.01)

(52) U.S. Cl.
CPC ............ *B60K 23/0808* (2013.01); *B60K 6/52* (2013.01); *B60K 17/356* (2013.01); *B60Y 2200/92* (2013.01); *B60Y 2400/82* (2013.01)

(58) Field of Classification Search
CPC .... B60K 23/0808; B60K 6/52; B60K 17/356; B60K 17/043; B60K 7/0007; B60K 17/02; B60Y 2200/92; B60Y 2400/82; B60Y 2400/303; B60Y 2300/42
See application file for complete search history.

(56) References Cited

U.S. PATENT DOCUMENTS

| | | | | |
|---|---|---|---|---|
| 9,810,190 B2 * | 11/2017 | Wang | ................... | F02N 11/0818 |
| 10,081,351 B2 * | 9/2018 | Yang | ..................... | B60K 6/387 |
| 10,435,007 B2 * | 10/2019 | Follen | ................... | B60W 10/08 |
| 10,676,077 B2 * | 6/2020 | Follen | ................ | B60H 1/00428 |
| 10,696,304 B2 * | 6/2020 | Seo | ........................ | B60W 30/06 |
| 10,730,477 B2 * | 8/2020 | Kumazaki | ............ | B60R 25/241 |
| 10,894,482 B2 * | 1/2021 | Follen | ...................... | B60K 6/48 |
| 10,960,872 B2 * | 3/2021 | Doering | .............. | F16H 61/0213 |
| 11,247,552 B2 * | 2/2022 | Follen | ................... | B60W 20/12 |
| 2009/0000411 A1 * | 1/2009 | Nakayama | ............... | F16H 61/12 74/335 |
| 2009/0242289 A1 * | 10/2009 | Murty | .................... | B60W 10/08 475/5 |
| 2011/0146438 A1 * | 6/2011 | Vernacchia | ........... | F16H 61/688 74/473.11 |
| 2013/0296118 A1 * | 11/2013 | Pietron | ................. | B60W 10/06 180/65.265 |

(Continued)

*Primary Examiner* — Donald J Wallace
*Assistant Examiner* — Jalal C Coduroglu
(74) *Attorney, Agent, or Firm* — PATTERSON + SHERIDAN, LLP (57) ABSTRACT

Various disclosed embodiments include illustrative controller units, vehicles, and methods. In an illustrative embodiment, a controller unit includes a processor and a memory. The memory is configured to store computer-executable instructions configured to cause the processor to receive a request to perform a mechanical load transition between a motor and a mechanical load, send a torque request to the motor responsive to the received request, receive a motor speed value, determine status of the mechanical load transition responsive to the received request and the motor speed value, and output the determined status.

20 Claims, 8 Drawing Sheets

(56) References Cited

U.S. PATENT DOCUMENTS

2015/0360892 A1* 12/2015 Yoshimizu ............. B65H 3/523
358/1.12
2021/0211069 A1* 7/2021 Reed ...................... H02N 1/004
2021/0309228 A1* 10/2021 Oguro .................... B60L 15/20

* cited by examiner

CONTROLLER UNITS, VEHICLES, AND METHODS FOR DETECTING ENGAGEMENT AND DISENGAGEMENT OF AN AXLE

INTRODUCTION

The present disclosure relates to vehicle operations. The statements in this section merely provide background information related to the present disclosure and may not constitute prior art.

Some all-wheel drive vehicles may operate in two-wheel drive mode until a loss of traction is sensed, at which time the non-engaged wheels are engaged. Transitions between engagement and non-engagement of wheels may occur frequently in all-wheel drive vehicles. Knowledge of completion of transitions is useful for efficient vehicle operation.

BRIEF SUMMARY

Various disclosed embodiments include illustrative systems, vehicles, and methods.

In an illustrative embodiment, a controller unit includes a processor and a memory. The memory is configured to store computer-executable instructions configured to cause the processor to receive a request to perform a mechanical load transition between a motor and a mechanical load, send a torque request to the motor responsive to the received request, receive a motor speed value, determine status of the mechanical load transition responsive to the received request and the motor speed value, and output the determined status.

In another illustrative embodiment, a vehicle includes a motor, an axle, a speed sensor configured to determine speed associated with the motor, a wheel couplable to the axle, a disconnect assembly configured to affect mechanical connection and disconnection between the motor and the axle, and a controller unit. The controller unit includes a processor and a memory. The memory is configured to store computer-executable instructions configured to cause the processor to receive a request to perform a connection transition between the motor and the axle, send a torque request to the motor responsive to the received request, receive a motor speed value from the speed sensor, determine status of the connection transition responsive to the received request and the motor speed value, and output the determined status.

In another illustrative embodiment, a method includes receiving a request to perform a mechanical load transition between a motor and a mechanical load, sending a torque request to the motor responsive to the received request, receiving a motor speed value, determining status of the mechanical load transition responsive to the received request and the motor speed value, and outputting the determined status.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controller units, vehicles, and methods. In such embodiments, various illustrative systems and methods may contribute to helping control vehicle stability.

Figure 1A:
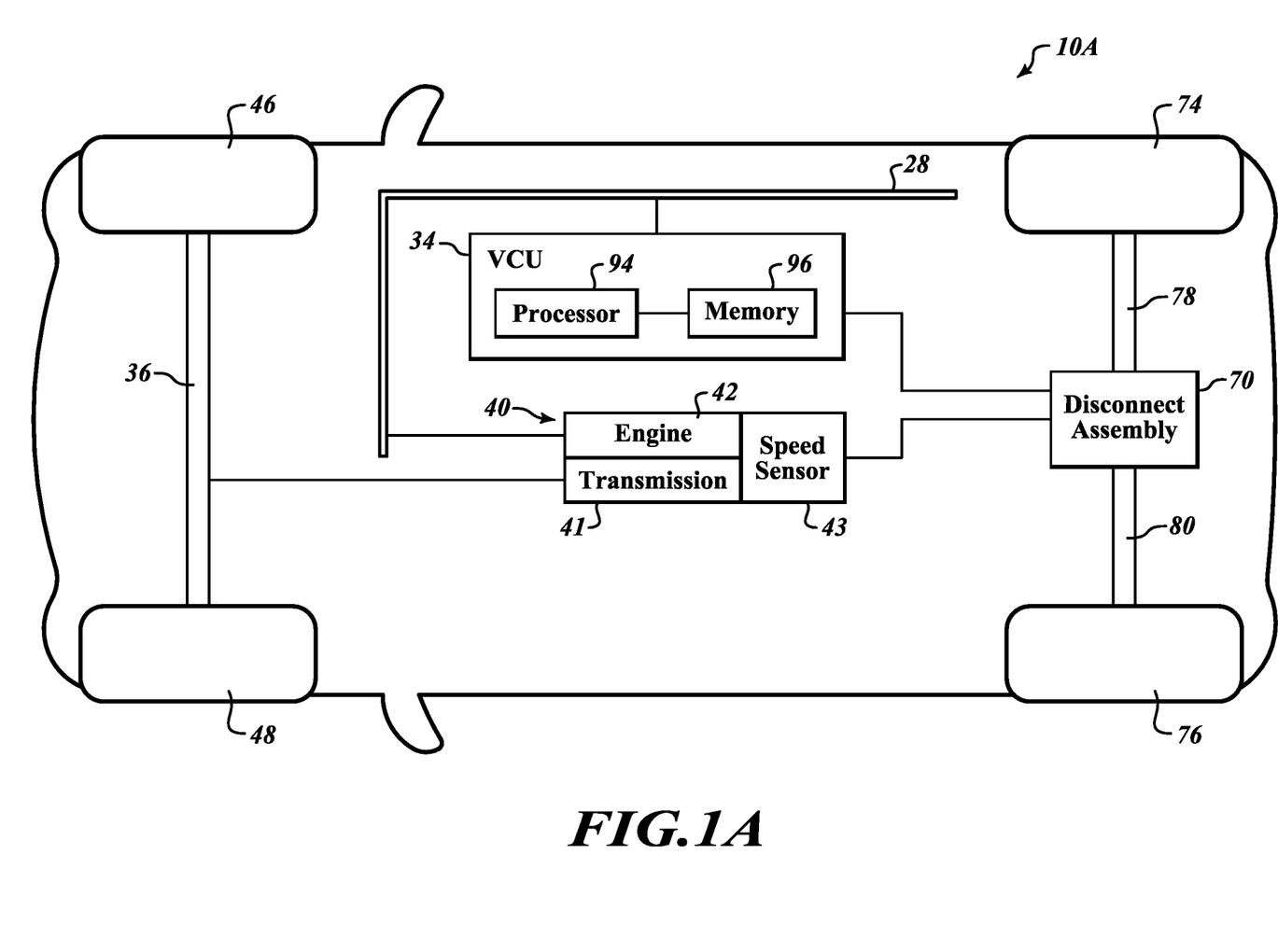
FIGS. 1A-C are block diagrams in partial schematic form of illustrative vehicles with illustrative vehicle handling systems.
Figure 1B:
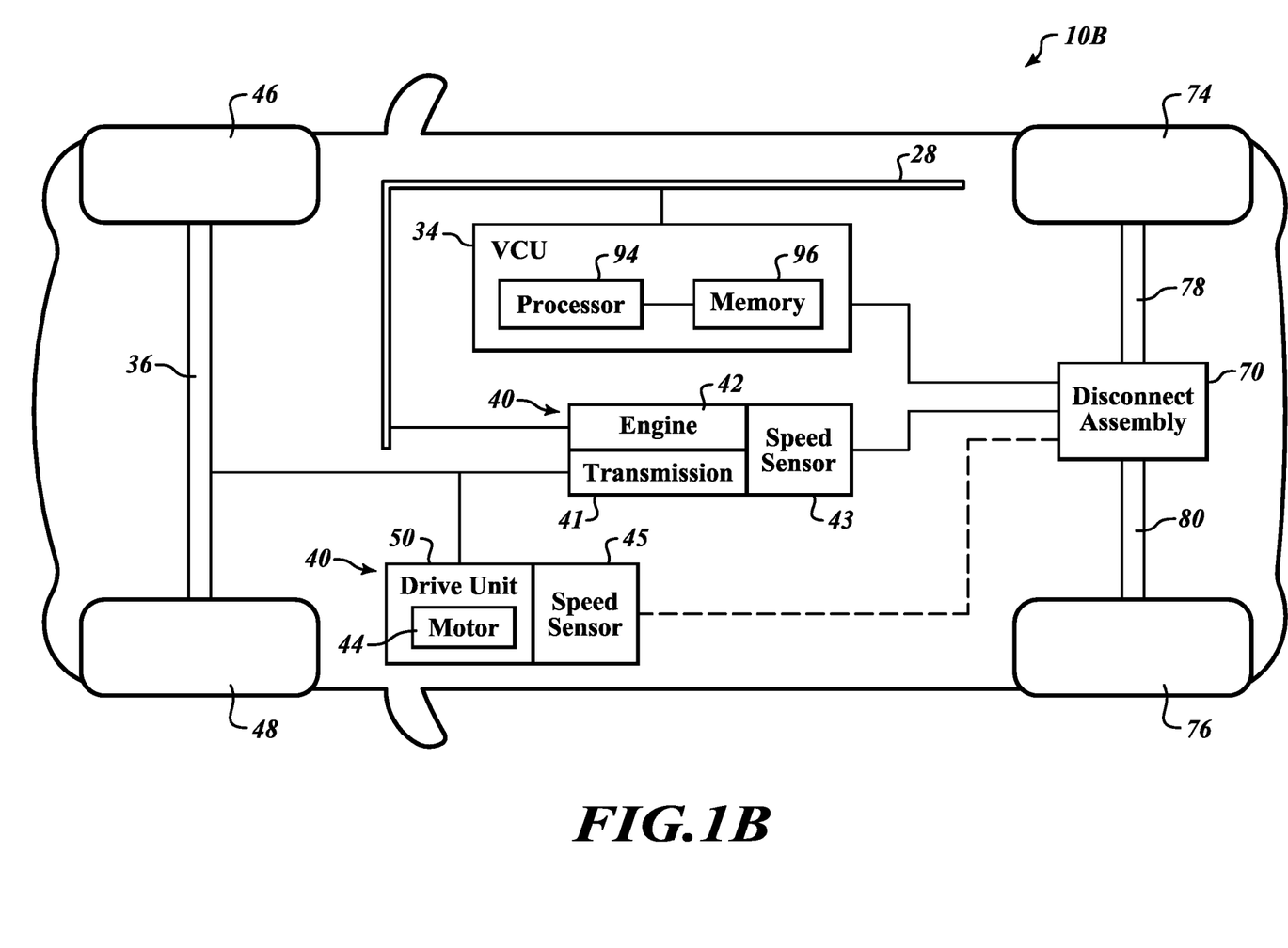
Figure 1C:
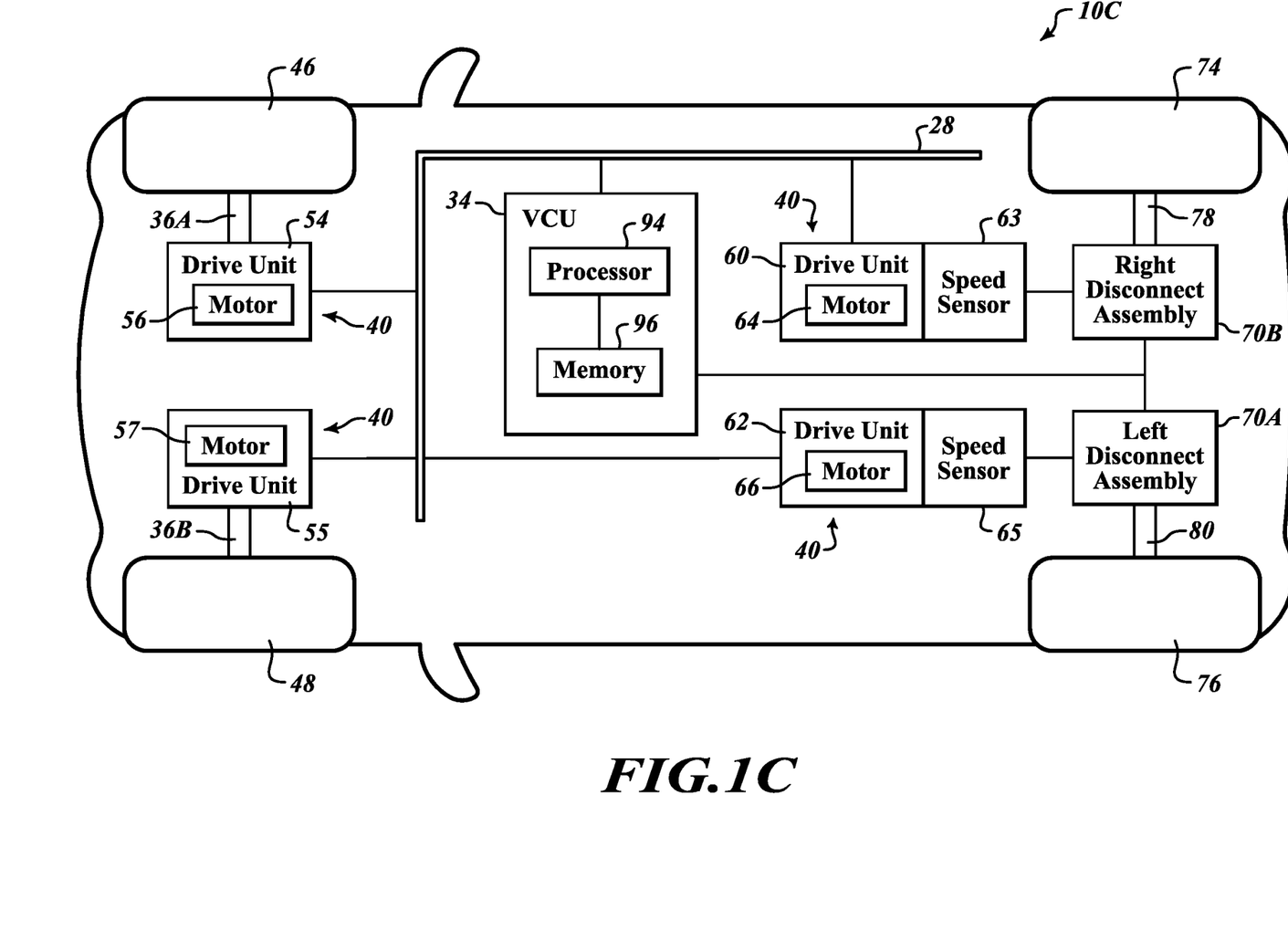

Referring to FIGS. 1A, 1B, and 1C and given by way of overview, in various embodiments an illustrative vehicle, such as a vehicle 10A (FIG. 1A), a vehicle 10B (FIG. 1B) and/or a vehicle 10C (FIG. 1C) is provided. In such embodiments the vehicle includes a vehicle control unit (VCU) 34 with components for determining status of engagement or disengagement of wheels with a motor after a request to transition from engaged to disengaged or from disengaged to engage has been received. As will be set forth in more detail below, in various embodiments the VCU 34 includes a processor 94 and a memory 96. The memory 96 is configured to store computer-executable instructions configured to cause the processor 34 to receive a request to perform a mechanical load transition between a motor and an axle, performed at a disconnect/disconnect assembly, such as a rear axle disconnect or a front axle disconnect, send a torque request to the motor responsive to the received request, receive a motor speed value from a speed sensor, receive a wheel speed value from a wheel speed sensor, determine status of the mechanical load transition responsive to the received request, the motor speed value, and the wheel speed value, and output the determined status.

In various embodiments at least one motor 40 provides locomotive force or propulsion force to propel the vehicle. As will be discussed below and as shown in FIG. 1A, in some embodiments the motor 40 may include an internal combustion engine (such as a spark ignition combustion engine or a compression ignition engine). As will also be discussed below and as shown in FIG. 1B, in some other embodiments the motor 40 may include a hybrid power plant that includes an internal combustion engine and an electric motor. As will also be discussed below and as shown in FIG. 1C, in some other embodiments the motor 40 may include an electric motor included within a drive unit. Thus, it will be appreciated that, as used herein, the term "motor" includes any device capable of generating a force for use in rotating an axle.

In various embodiments and as shown in FIG. 1A, the motor 40 is an internal combustion engine 42 that is configured to propel the vehicle 10A. In some such embodiments the motor 40 powers a front axle 36 coupled to front wheels 46 and 48 and a pair of rear axles 78 and 80 coupled to rear wheels 74 and 76, respectively, via a transmission 41. A disconnect/disconnect assembly 70 is disposed between the transmission 41 and the pair of rear axles 78 and 80 and is configured to selectably connect and disconnect the rear axles 78 and 80 to and from the transmission 41 as desired. In various embodiments, the disconnect/disconnect assembly 70 may connect to a single shaft from the transmission 41 that is then coupled to the pair of rear axles 78 and 80 via a coupler, such as without limitation a differential, a slip differential, or the like. In some other embodiments a single rear axle may be used in place of the pair of rear axles 78 and 80. It will be appreciated by one of ordinary skill in the art that in some embodiments the motor 40 may power the rear axle or axles 78 and 80 and the disconnect/disconnect assembly 70 may be connected to the front axle 36. Disconnect assemblies will be discussed in detail below. However, transmission connections including differentials and the like are well known in the art and no further explanation is necessary for a person of skill in the art to understand disclosed subject matter.

In various embodiments and as shown in FIG. 1B, an illustrative vehicle 10B is a dual-motor or hybrid electric vehicle. In such embodiments, the vehicle 10B suitably includes the components included in the single-engine vehicle 10A (FIG. 1A). In such embodiments the motor 40 of the vehicle 10B includes the internal combustion engine 42 and an electric motor drive unit 50. In some such embodiments the electric motor drive unit 50 includes an electric motor 44 that is coupled to the front axle 36. In some such embodiments the electric motor drive unit 50 is also selectably connectable and disconnectable to and from the rear axles 78 and 80 via the disconnect/disconnect assembly 70 in optional all-wheel drive electric configurations. As in the vehicle 10A (FIG. 1A), in some embodiments a single rear axle may be used in place of the pair of rear axles 78 and 80. It will be appreciated by one of ordinary skill in the art that in some embodiments the motor 40 may power the rear axle or axles 78 and 80 and the disconnect/disconnect assembly 70 may be connected to the front axle 36.

Referring additionally to FIG. 1C, in various embodiments an illustrative vehicle 10C is an electric vehicle. In such embodiments the vehicle 10C includes two or more of the motors 40. In some such embodiments, the motor 40 includes front electric motor drive units 54 and 55 with electric motors 56 and 57 that are coupled to the respective front wheels 46 and 48 via front axles 36A and 36B. In some other such embodiments the front electric motor drive units 54 and 55 may be replaced by a single electric motor drive unit couplable to the front axles 36A and 36B or to a single front axle. In some such embodiments, another motor 40 includes rear electric motor drive units 60 and 62 with electric motors 64 and 66 that are coupled to the respective rear wheels 74 and 76 via rear axles 78 and 80 via a left disconnect assembly 70A and a right disconnect assembly 70B, respectively. In some other such embodiments the rear electric motor drive units 60 and 62 may be replaced by a single electric motor drive unit couplable to the rear axles 78 and 80 via the disconnect assemblies 70A and 70B, respectively, or to a single rear axle via a single disconnect assembly.

In various embodiments the VCU 34 controls operations of at least one disconnect assembly, such as the disconnect/disconnect assembly 70 (FIGS. 1A and 1B) or the left disconnect assembly 70A and the right disconnect assembly 70B (FIG. 1C). In various embodiments, the VCU 34 includes a processor 94 and a memory 96. The disconnect assemblies 70, 70A, and 70B will be described in more detail below.

In various embodiments the VCU 34 controls all-wheel drive functionality. The VCU 34 controls power supplied to the wheels 46, 48, 74, and 76 of the vehicles 10A, 10B, and 10C. In certain operational conditions, such as without limitations, cruising speeds, no experienced wheel slippage, or sensed differential torque issues, the VCU 34 disengages two wheels to operate in a more efficient two-wheel drive mode. In some such embodiments and as shown in FIGS. 1A, 1B, and 1C, the two-wheel drive mode is a front-wheel drive mode. However, it will be appreciated that, in some other such embodiments, the two-wheel drive mode is a rear-wheel drive mode. Requests to transitions between two-wheel drive mode and all-wheel drive mode are considered requests generated by the VCU 34 to perform mechanic load transitions (engagements and disengagements) between the motor and the axles. How and why these requests are generated are a regular part of all-wheel drive operations and all-wheel drive operations are well known in the art and no further explanation is necessary for a person of skill in the art to understand disclosed subject matter. The below description is given by way of illustration only and not of limitation and relates to confirming an engagement or a disengagement of the rear wheels from the motor 40 responsive to a request to engage or disengage. However, as mentioned above, it will be appreciated that the front wheels 46 and 48 may be engaged or disengaged responsive to a request to engage or disengage.

In various embodiments the motor 40 and the VCU 34 may communicate via a data bus 28, such as without limitation a controller area network (CAN) bus or the like. Other data buses or peer-to-peer network buses, such as a local area network (LAN), a wide area network (WAN), a value-added network (VAN), or the like may also be used for enabling communication between the components of the vehicle 10A, 10B, or 10C as desired for a particular application.

In various embodiments the motors 40 of FIGS. 1A and 1B include a speed sensor 43 and the motors 40 of FIG. 1C include speed sensors 63 and 65. The speed sensors 43, 63, and 65 produce a motor speed value/signal. The vehicles 10A-C include wheel speed sensors 49 located at the wheels associated with the disconnect assemblies 70, 70A, and 70B. The speed sensors 43, 49, 63, and 65 may include mechanical, optical, magnetic, or electromagnetic induction encoders. Encoders are well known in the art and no further explanation is necessary for a person of skill in the art to understand disclosed subject matter.

In various embodiments and given by way of example only and not of limitation, the rear electric motor drive units 60 and 62 of the vehicle 10C may include motor controllers and motors, such as brushless direct current (BLDC) motors, alternating current induction motors (ACIM), permanent magnet synchronous motors (PMSM), interior PM motors (IPMM), PM switch reluctance motors (PMSRM), or comparable battery-powered/fuel cell-powered motors.

In various embodiments and given by way of example only and not of limitation, the disconnect assemblies 70, 70A, and 70B may include gears that are configured to transfer force from the motors 40 to the respective rear wheels 74 and 76 and rear axles 78 and 80. The disconnect assemblies 70, 70A, and 70B may include pocket plates with actuatable struts, multi-clutch plates, clutch motors, differentials with clutch devices, or the like. Pocket plates with actuatable struts, multi-clutch plates, clutch motors, and differentials with clutch devices are well known in the art and no further explanation is necessary for a person of skill in the art to understand disclosed subject matter.

In various embodiments the computer-executable instructions are configured to cause the processor 94 to receive a request to perform a mechanical load transition between a motor and an axle. The mechanical load transition may include engaging or disengaging the motor 40 to the axle (mechanical load), such as rear axles 78 or 80, via the respective disconnect assemblies 70, 70A, or 70B.

In various embodiments the disconnect assemblies 70, 70A, or 70B are configured to apply an engagement action responsive to a generated engage wheel request signal (request). Engagement actions include performing speed matching between the motor 40 and the respective rear axles 78 or 80, then mechanically locking the motor 40 to the respective axle 78 and 80.

In various embodiments the request to perform a mechanical load transition from disengaged to engaged, may be a result of the VCU 34 determining an increased stability condition exists due to a sense of loss of traction, a predicted increased stability condition, or the like.

In various embodiments the request to perform a mechanical load transition from engaged to disengaged, may be a result of the VCU 34 determining an increased stability condition does not exist, vehicle speed is below a threshold value, or the like.

In various embodiments the computer-executable instructions are configured to cause the processor 94 to send a torque request to the motor 40 responsive to the received request. The torque request may be a request to apply a torque pulse over and above any current torque request being sent to the motor 40. The torque pulse requested may be a request to increase or decrease motor torque, such as, without limitation, 5-15 N-m, of the motor 40 for an instantaneous or near instantaneous amount of time, such as, without limitation, less than 100 ms. When the request to perform a mechanical load transition is a request to disengage the motor 40 from the axle (mechanical load), such as rear axles 78 or 80, the torque pulse may be either a request to increase or decrease torque of the motor 40 for an instantaneous or near instantaneous amount of time. When the motor 40 is applying the requested torque pulse, the motor speed will be affected differently depending upon whether the mechanical load is connected or not. Motor speed exhibits a runaway condition in response to a positive torque pulse when no mechanical load is connected and does not when the mechanical load is connected.

In various embodiments the computer-executable instructions are configured to cause the processor 94 to receive a motor speed value from the speed sensor 43, 63, or 65, determine status of the mechanical load transition responsive to the received request and the motor speed value, and output the determined status.

In various embodiments the instructions are configured to cause the processor 94 to determine the mechanical load transition has occurred responsive to the motor speed indicating that the mechanical load is not connected to the motor and the request to perform being a request to disconnect the motor from the mechanical load. The motor speed indicates that the mechanical load is not connected to the motor, when the motor speed exhibits an unloaded, runaway motor scenario in response to a torque pulse. A predefined threshold speed or change of speed (a first threshold speed value) may be used to compare to the received motor speed to determine whether or not the mechanical load has been disconnected from the motor. The threshold speed or change of speed may be a positive value when the torque pulse is a positive torque pulse. A negative torque pulse may be used in response to a request to disconnect.

Figure 2:
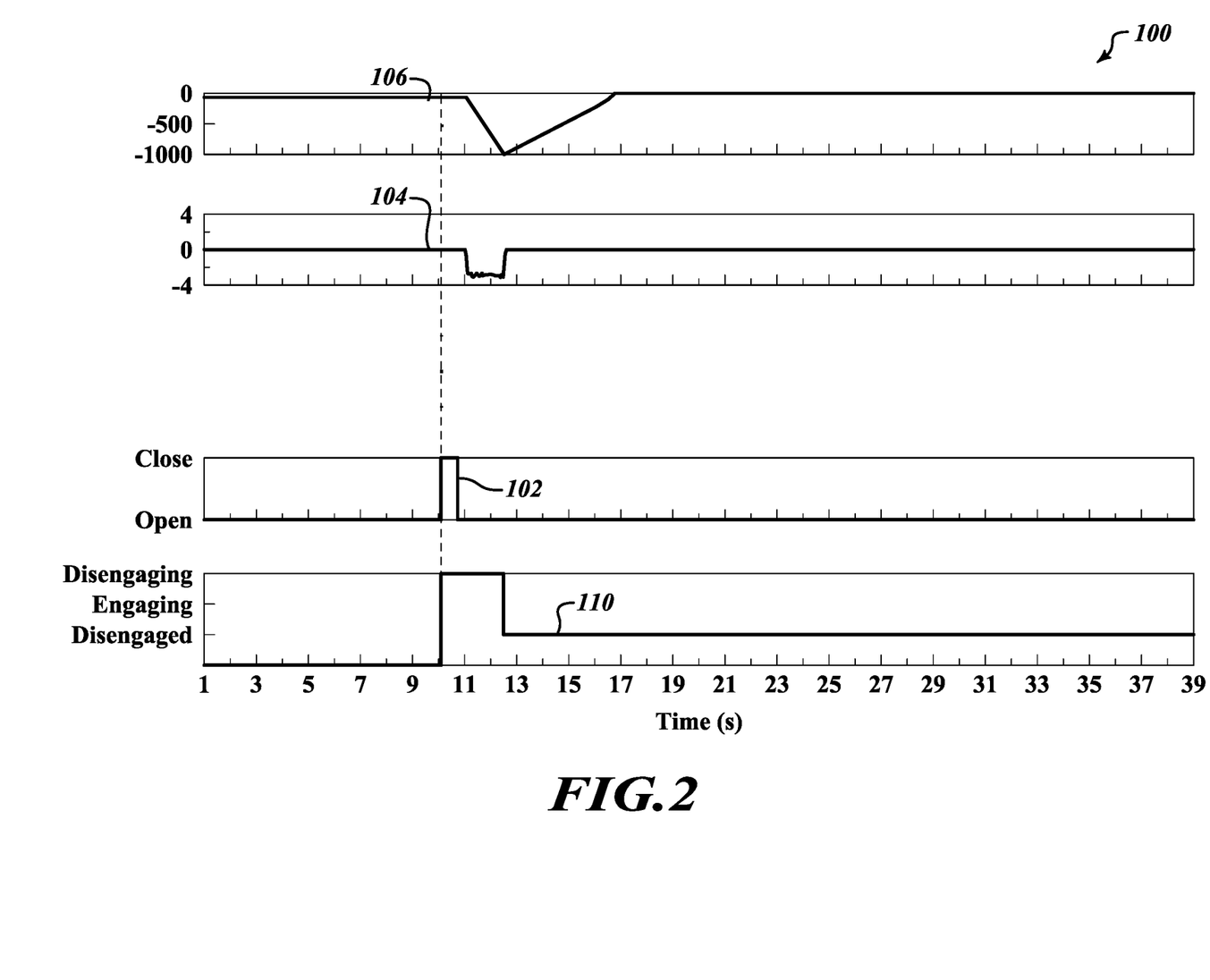
FIG. 2 is a time chart of illustrative signals used in a disconnect situation.

Referring additionally to FIG. 2, a timeline of illustrative signals 100 illustrates a transition, described above, where a mechanical load, such as a rear axle disconnect, a front axle disconnect, or any of the disconnect assemblies 70, 70A, and 70B described above, is disconnected to the motor. A request to disconnect 102 initiates the mechanical load transitioning to a disconnected state. In response to the request to disconnect 102, a torque pulse signal 104, in this case a negative pulse, is supplied to the motor. The motor speed signal 106 is analyzed to determine if the speed value relative to the threshold speed or change in speed indicates that the disconnection has occurred. The speed signal 106 shows it going slower relative to a wheel speed signal. This indicates that since the speed signals 106 don't match, the motor and wheel are not coupled (disconnected). An action determination signal 110 indicates the confirmation of the transition to disengagement.

In various embodiments the instructions are configured to cause the processor 94 to determine the mechanical load transition has occurred responsive to the motor speed indicating that the mechanical load is connected to the motor and the request to perform being a request to connect the motor to the mechanical load. The motor speed indicates that the mechanical load is connected to the motor, when the motor speed exhibits a loaded motor scenario. A predefined threshold speed or change of speed (a second threshold speed value) may be used to compare to the received motor speed to determine whether or not the mechanical load is now connected to the motor. The threshold speed or change of speed may be a non-changing or negative value, thus indicating that no runaway exists and the motor is driving a load (connected to the axle).

Figure 3:
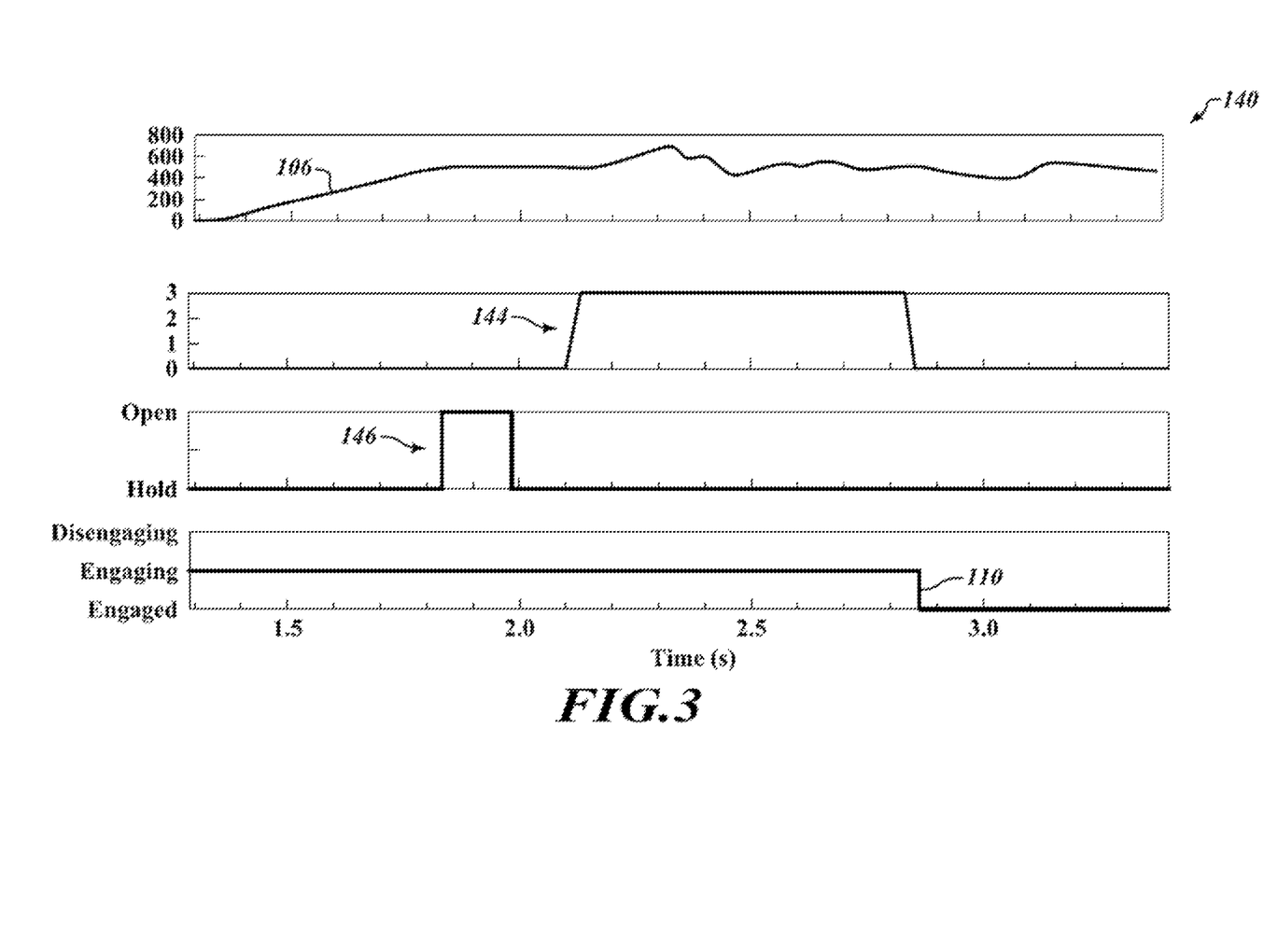
FIG. 3 is a time chart of illustrative signals used in a connect situation.

Referring additionally to FIG. 3, a timeline of illustrative signals 140 illustrates a transition, described above, where a mechanical load, such as a rear axle disconnect, front axle disconnect, or any of the disconnect assemblies 70, 70A, and 70B described above, is connected/reconnected to the motor. A request to connect signal 146 initiates the mechanical load transitioning to a connected state. In response to the request to connect, a torque pulse signal 144 is supplied to the motor. The motor speed signal 106 is analyzed to determine if the speed value relative to the threshold speed or change in speed indicates that the connection has occurred. The motor speed signal 106 is not indicating a runaway condition, thus signifying that the mechanical load is now connected. An action determination signal 110 indicates the confirmation of the transition to engagement.

In various embodiments the instructions are configured to cause the processor 94 to determine the mechanical load transition has not occurred responsive to the motor speed indicating the mechanical load is not connected to the motor and the request to perform being a request to connect the motor to the mechanical load. The instructions are configured to cause the processor 94 to output an error signal responsive to the status of the mechanical load transition indicating that the mechanical load transition has not occurred.

In various embodiments the instructions are configured to cause the processor 94 to determine the mechanical load transition has not occurred responsive to the motor speed indicating that the mechanical load is connected to the motor and the request to perform being a request to disconnect the motor from the mechanical load. The instructions are configured to cause the processor 94 to output an error signal responsive to the status of the mechanical load transition indicating that the mechanical load transition has not occurred.

In various embodiments the instructions are configured to cause the processor 94 to repeat sending the torque request to the motor 40, receiving the motor speed value from the respective motor speed sensor 43, 63, or 65, and determining the status of the mechanical load transition, responsive to a previous determination that the status of the mechanical load transition has not occurred.

Figure 4:
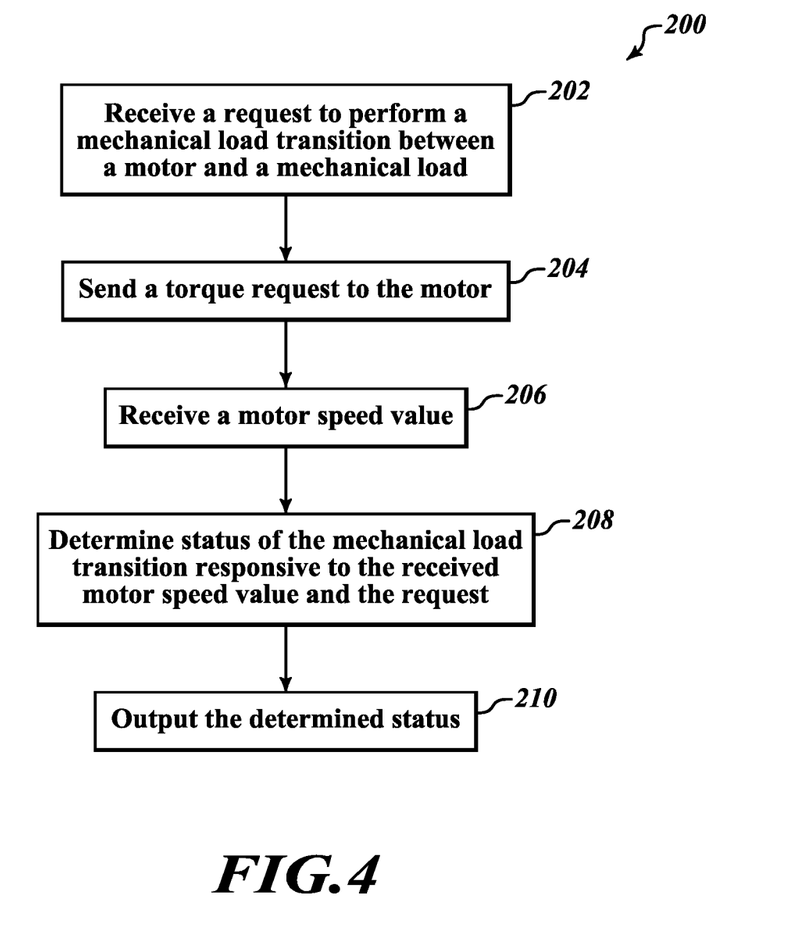
FIG. 4 is a flow diagram of an illustrative method for determining vehicle stability transition.

Referring additionally to FIG. 4, in various embodiments an illustrative method 200 is provided for verifying status of a mechanical load transition. It will be appreciated that the mechanical load transition can be any type of mechanical load transition whatsoever and is not limited to any particular mechanical load transition. For example, in general such mechanical load transitions can include without limitation any connection transition between a motor and any load whatsoever, such as without limitation a shaft for an object to be rotated by the motor, such as a wheel, a generator, a pump, a turbine, a tool, an end effector, or any load whatsoever as desired without any limitation. Given by way of illustration only and not of limitation, a non-limiting example of a mechanical load transition can include, without limitation, a connection transition between a motor and an axle of a vehicle. However, it is emphasized that no limitation to a connection transition between a motor and an axle of a vehicle is intended and that no such limitation is to be inferred.

At a block 202, a request to perform a mechanical load transition between a motor and a mechanical load is received. At a block 204, a torque request is sent to the motor responsive to the received request. At a block 206, a motor speed value is received. At a block 208, status of the mechanical load transition is determined responsive to the received request and the motor speed value. At a block 210, the determined status is outputted.

In some embodiments sending the torque request to the motor, receiving the motor speed value, and determining the status of the mechanical load transition are repeated responsive to a previous determination that the status of the mechanical load transition has not occurred.

In some embodiments the torque request further includes a torque pulse request.

In some embodiments determining the status includes determining the mechanical load transition has occurred responsive to the motor speed indicating the mechanical load is not connected to the motor and the request to perform being a request to disconnect the motor from the mechanical load.

In some embodiments determining includes determining the mechanical load transition has not occurred responsive to the motor speed indicating the mechanical load is not connected to the motor and the request to perform being a request to connect the motor to the mechanical load. An error signal is outputted responsive to the status of the mechanical load transition indicating that the mechanical load transition has not occurred.

In some embodiments determining includes determining the mechanical load transition has not occurred responsive to the motor speed indicating the mechanical load is connected to the motor and the request to perform being a request to disconnect the motor from the mechanical load. An error signal is outputted responsive to the status of the mechanical load transition indicating that the mechanical load transition has not occurred.

Figure 5:
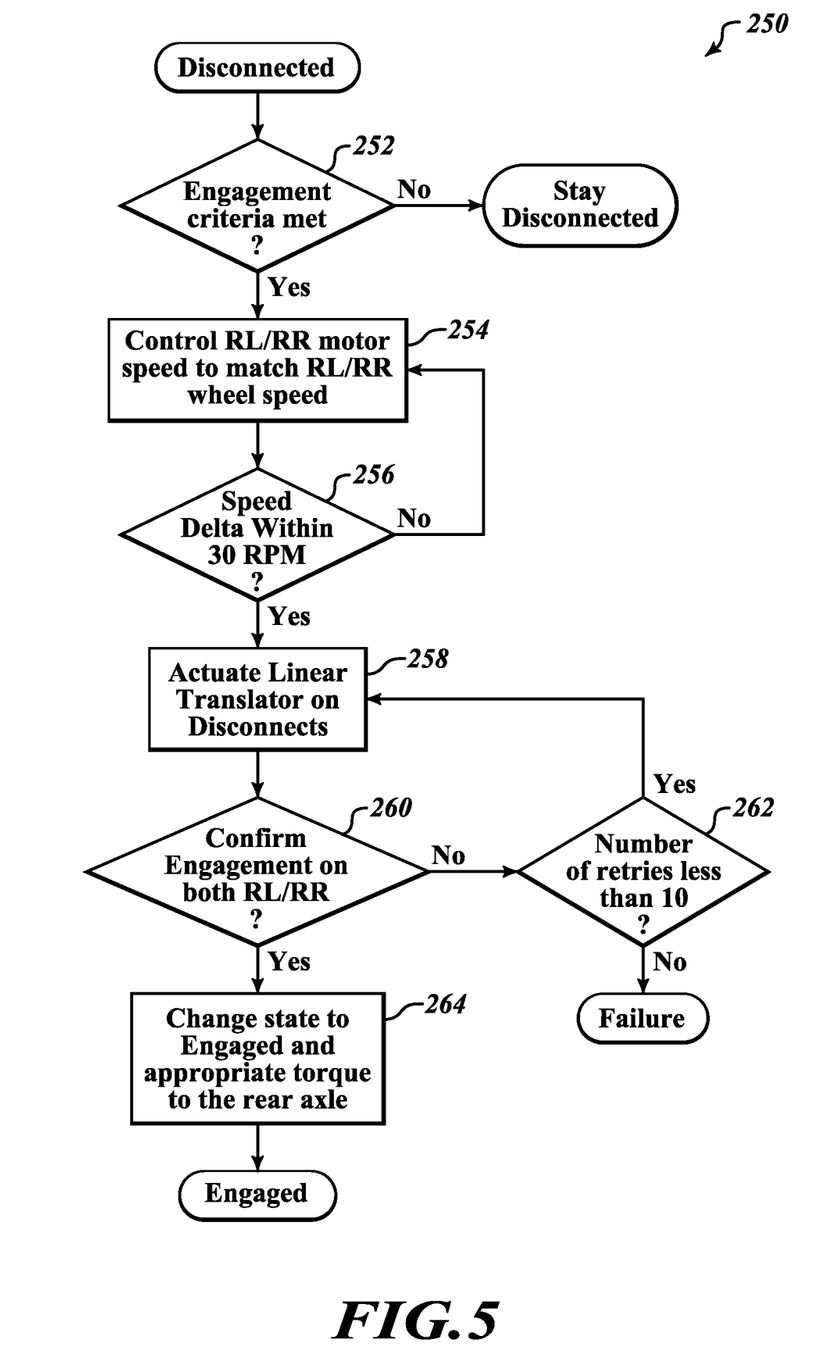
FIG. 5 is a flow diagram of an illustrative method for engaging an axle disconnect.

Referring additionally to FIG. 5, in various embodiments an illustrative method 250 is provided for engaging rear left (RL) and rear right (RR) motors to respective RL and RR wheels. It will be appreciated that the illustrative method 250 is an example of an embodiment in the context of a vehicle of the method 200 (FIG. 4). While the illustrative method 250 is shown in FIG. 5 by way of a non-limiting example directed to rear wheels, it will be appreciated that, in some embodiments, the method 250 is also suitable for engaging front left and front right motors to respective front left and front right wheels.

At a block 252, a determination is made whether an engagement criteria has been met. If the engagement criteria has not been met, the RL and RR motors remain disconnected from the RL and RR wheels. Once the engagement criteria has been met, then, at a block 254, speeds of the RL and RR motors are controlled relative to the speeds of the RL and RR wheels. At a block 256, a determination is made whether the difference between the speeds of the RL and RR motors and the speeds of the RL and RR wheels are within an acceptable threshold, such as without limitation within 30 RPMs. At a block 258, when the speeds of the RL and RR motors and the speeds of the RL and RR wheels are determined to be within the acceptable threshold, linear translators on disconnects located between the RL motor and the RL wheel and between the RR motor and the RR wheel are actuated for performing the engagement process.

At a block 260, engagement of the RL wheel and the RL motor and engagement of the RR wheel and the RR motor are confirmed. If, at the block 260, the engagement is not confirmed, then at a block 262, the actuation of the linear translators is retried up to a threshold number of retries, such as, without limitation, 10 retries. If the number of retries has maxed out, then a failure notification is produced. If the engagement is confirmed, then at the block 262, the state is changed to indicate engaged and an appropriate torque is applied to the axles associated with the RL and RR wheels.

It is again emphasized that, while the illustrative method 250 is shown in FIG. 5 by way of a non-limiting example directed to rear wheels, it will be appreciated that, in some embodiments, the method 250 is also suitable for engaging front left and front right motors to respective front left and front right wheels.

Figure 6:
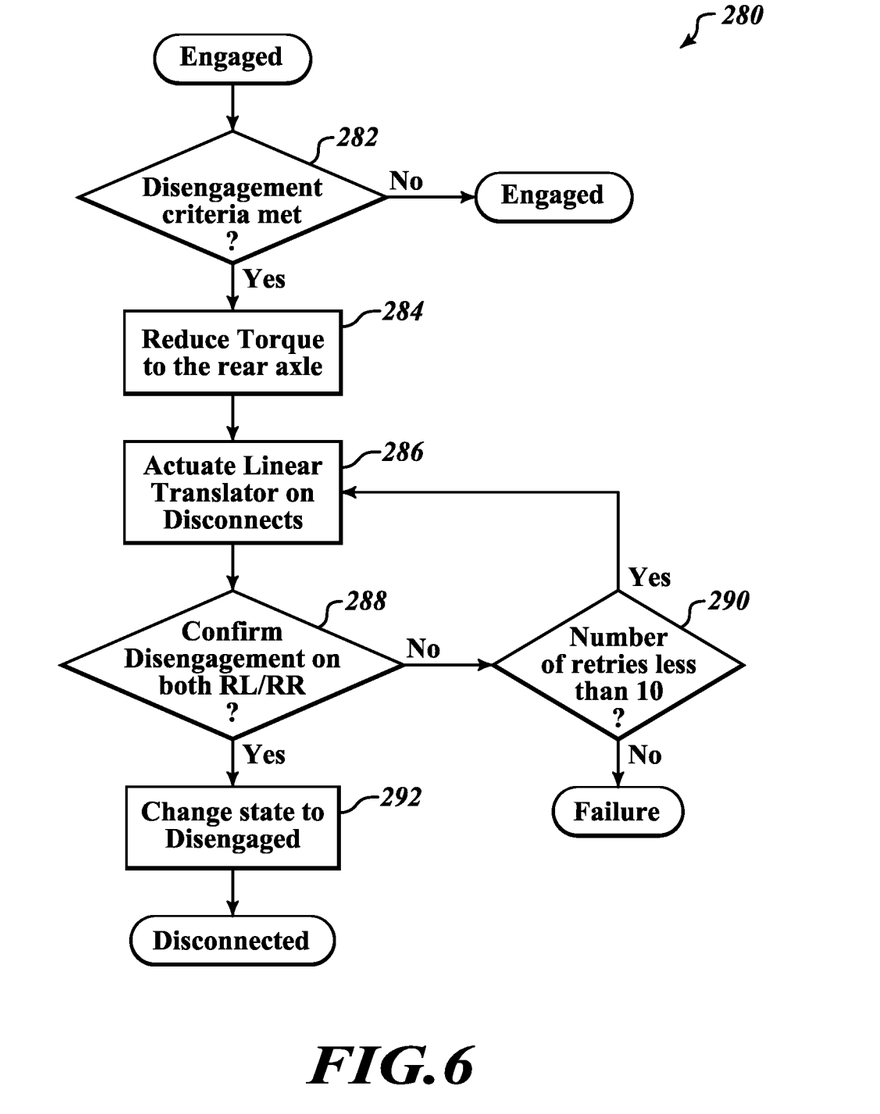
FIG. 6 is a flow diagram of an illustrative method for disengaging an axle disconnect.

Referring additionally to FIG. 6, in various embodiments an illustrative method 280 is provided for disengaging RL and RR motors from RL and RR wheels. It will be appreciated that the illustrative method 280 is an example of an embodiment in the context of a vehicle of the method 200 (FIG. 4). While the illustrative method 280 is shown in FIG. 6 by way of a non-limiting example directed to rear wheels, it will be appreciated that, in some embodiments, the method 280 is also suitable for disengaging front left and front right motors from respective front left and front right wheels.

At a block 282, a determination is made whether a disengagement criteria has been met. If the disengagement criteria has not been met, the RL and RR motors remain connected/engaged from the RL and RR wheels. Once the disengagement criteria has been met, then, at a block 284, torque is reduced to the respective rear axles. At a block 286, linear translators on the disconnects located between the RL motor and the RL wheel and between the RR motor and the RR wheel are actuated for performing the disengagement process.

At a block 288, disengagement of the RL wheel and the RL motor and disengagement of the RR wheel and the RR motor are confirmed. If, at the block 288, the disengagement is not confirmed, then at a block 290, the actuation of the linear translators is retried up to a threshold number of retries, such as, without limitation, 10 retries. If the number of retries has maxed out, then a failure notification is produced. If the disengagement is confirmed, then at a block 292, the state is changed to indicate disengaged.

It is again emphasized that, while the illustrative method 280 is shown in FIG. 6 by way of a non-limiting example directed to rear wheels, it will be appreciated that, in some embodiments, the method 280 is also suitable for disengaging front left and front right motors from respective front left and front right wheels.

Those skilled in the art will recognize that at least a portion of the VCU 34, controllers, motor controllers, components, devices and/or processes described herein can be integrated into a data processing system. Those having skill in the art will recognize that a data processing system generally includes one or more of a system unit housing; a video display device; memory such as volatile or non-volatile memory; processors such as microprocessors or digital signal processors; computational entities such as operating systems, drivers, graphical user interfaces, and applications programs; one or more interaction devices (e.g., a touch pad, a touch screen, an antenna, etc.); and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term unit/module/controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of component (e.g., at a first time), as a second type of component (e.g., at a second time, which may in some instances coincide with, overlap, or follow a first time), and/or as a third type of component (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second component that has a second purpose and then, a third component that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different components in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller unit comprising:
    a processor; and
    a memory configured to store computer-executable instructions configured to cause the processor to:
        receive a request to perform a mechanical load transition between an electric motor drive unit including an electric motor, and a mechanical load including a disconnect assembly configured to selectively connect and disconnect a vehicle axle to and from the electric motor;
        send a torque request to the electric motor responsive to the received request;
        receive a motor speed value;
        determine status of the mechanical load transition responsive to the received request and the motor speed value; and
        output the determined status.

2. The controller unit of claim 1, wherein determining the status includes:
    determining the mechanical load transition has occurred responsive to the motor speed indicating the mechanical load is not connected to the electric motor and the request to perform being a request to disconnect the electric motor from the mechanical load.

3. The controller unit of claim 2, wherein determining the status includes:
    determining the mechanical load transition has occurred responsive to the motor speed being greater than a first threshold speed value.

4. The controller unit of claim 1, wherein determining the status includes:

determining the mechanical load transition has occurred responsive to the motor speed indicating the mechanical load is connected to the electric motor and the request to perform being a request to connect the electric motor to the mechanical load.

5. The controller unit of claim 4, wherein determining the status includes:
determining the mechanical load transition has occurred responsive to the motor speed being less than a second threshold speed value.

6. The controller unit of claim 1, wherein:
determining the status includes determining the mechanical load transition has not occurred responsive to the motor speed indicating the mechanical load is not connected to the electric motor and the request to perform being a request to connect the electric motor to the mechanical load; and
outputting further includes outputting an error signal responsive to the status of the mechanical load transition indicating that the mechanical load transition has not occurred.

7. The controller unit of claim 1, wherein:
determining the status includes determining the mechanical load transition has not occurred responsive to the motor speed indicating the mechanical load is connected to the electric motor and the request to perform being a request to disconnect the electric motor from the mechanical load; and
outputting further includes outputting an error signal responsive to the status of the mechanical load transition indicating that the mechanical load transition has not occurred.

8. A vehicle comprising:
an electric motor drive unit including an electric motor;
an axle;
a speed sensor configured to determine speed associated with the electric motor;
a wheel couplable to the axle;
a disconnect assembly configured to affect mechanical connection and disconnection between the electric motor and the axle; and
a controller unit comprising:
a processor; and
a memory configured to store computer-executable instructions configured to cause the processor to:
receive a request to perform a connection transition between the electric motor and the axle;
send a torque request to the electric motor responsive to the received request;
receive a motor speed value from the speed sensor;
determine status of the connection transition responsive to the received request and the motor speed value; and
output the determined status.

9. The vehicle of claim 8, wherein outputting further includes outputting an error signal responsive to the determined status of the connection transition indicating that the connection transition has not occurred.

10. The vehicle of claim 8, wherein determining the status includes:
determining the connection transition has occurred responsive to the motor speed indicating the axle is not connected to the electric motor and the request to perform being a request to disconnect the electric motor from the axle.

11. The vehicle of claim 10, wherein determining the status includes:

determining the connection transition has occurred responsive to the motor speed being greater than a first threshold speed value.

12. The vehicle of claim 8, wherein determining the status includes:
determining the connection transition has occurred responsive to the motor speed indicating the axle is connected to the electric motor and the request to perform being a request to connect the electric motor to the axle.

13. The vehicle of claim 12, wherein determining the status includes:
determining the connection transition has occurred responsive to the motor speed being less than a second threshold speed value.

14. A method comprising:
receiving a request to perform a mechanical load transition between an electric motor drive unit including an electric motor, and a mechanical load including a disconnect assembly configured to selectively connect and disconnect a vehicle axle to and from the electric motor;
sending a torque request to the electric motor responsive to the received request;
receiving a motor speed value;
determining status of the mechanical load transition responsive to the received request and the motor speed value; and
outputting the determined status.

15. The method of claim 14, wherein determining the status includes:
determining the mechanical load transition has occurred responsive to the motor speed indicating the mechanical load is not connected to the electric motor and the request to perform being a request to disconnect the electric motor from the mechanical load.

16. The method of claim 15, wherein determining the status includes:
determining the mechanical load transition has occurred responsive to the motor speed being greater than a first threshold speed value.

17. The method of claim 14, wherein determining includes:
determining the mechanical load transition has occurred responsive to the motor speed indicating the mechanical load is connected to the electric motor and the request to perform being a request to connect the electric motor to the mechanical load.

18. The method of claim 17, wherein determining the status includes:
determining the mechanical load transition has occurred responsive to the motor speed being less than a second threshold speed value.

19. The method of claim 14, wherein:
determining includes determining the mechanical load transition has not occurred responsive to the motor speed indicating the mechanical load is not connected to the electric motor and the request to perform being a request to connect the electric motor to the mechanical load; and
outputting further includes outputting an error signal responsive to the status of the mechanical load transition indicating that the mechanical load transition has not occurred.

20. The method of claim 14, wherein:
determining includes determining the mechanical load transition has not occurred responsive to the motor speed indicating the mechanical load is connected to the electric motor and the request to perform being a request to disconnect the electric motor from the mechanical load; and outputting further includes outputting an error signal responsive to the status of the mechanical load transition indicating that the mechanical load transition has not occurred.

\* \* \* \* \*